(12) United States Patent
Tran et al.

(10) Patent No.: US 6,510,275 B1
(45) Date of Patent: Jan. 21, 2003

(54) MICRO-OPTOELECTROMECHANICAL SYSTEM BASED DEVICE WITH ALIGNED STRUCTURES AND METHOD FOR FABRICATING SAME

(75) Inventors: Alex Tran, Madison, NJ (US); Joel A. Kubby, Rochester, NY (US); Jingkuang Chen, Rochester, NY (US); Peter Gulvin, Webster, NY (US); Kathleen A. Feinberg, Rochester, NY (US); Yi Su, Portland, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/986,399

(22) Filed: Nov. 8, 2001

(51) Int. Cl.[7] ............................. G02B 6/00; G02B 6/36
(52) U.S. Cl. ....................... 385/139; 385/88; 385/14; 385/37
(58) Field of Search ..................... 385/139, 88, 14, 385/37

(56) References Cited

U.S. PATENT DOCUMENTS 5,426,070 A * 6/1995 Shaw et al. ................. 216/2
5,719,073 A * 2/1998 Shaw et al. ................. 438/53
6,328,482 B1 * 12/2001 Jian ............................ 385/88
2001/0008457 A1 * 7/2001 Zhang ....................... 359/238
2002/0127760 A1 * 9/2002 Yeh et al. ................... 438/50

* cited by examiner

Primary Examiner—Brian Healy
Assistant Examiner—Tina Lin
(74) Attorney, Agent, or Firm—Oliff & Berridge, PLC

(57) ABSTRACT

A micro-optoelectromechanical system based device with aligned structures comprises at least one optical structure formed in a silicon layer of the device and at least one optical fiber connection structure that is self-aligned with the at least one optical structure. In embodiments, the at least one optical fiber connection structure is formed in a substrate of the device and may comprise a V-groove. In other embodiments, the at least one optical structure may comprise a waveguide. A nitride layer may be formed on at least a portion of the waveguide. In various embodiments, the silicon layer may be a single-crystal-silicon layer of a silicon-on-insulator wafer. A method for fabricating a micro-optoelectromechanical system based device with aligned structures is provided in which the at least one optical structure and the at least one optical fiber connection structure are defined using the same masking layer.

20 Claims, 6 Drawing Sheets

FIG. 7
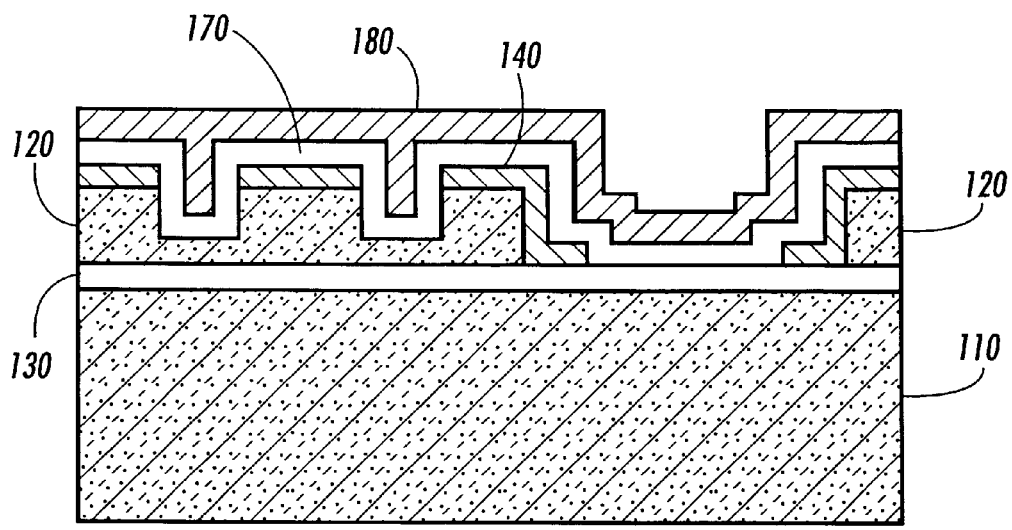
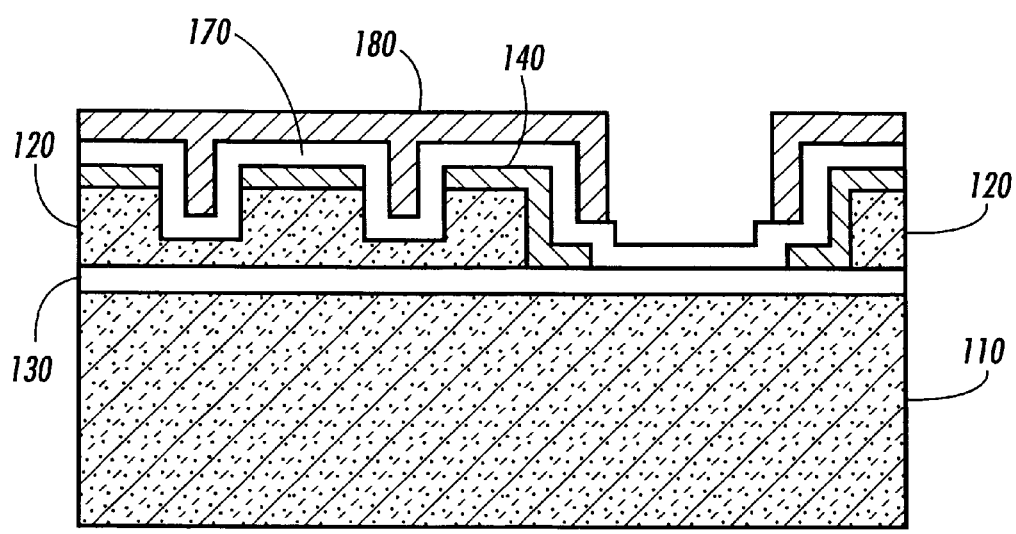
FIG. 8

MICRO-OPTOELECTROMECHANICAL SYSTEM BASED DEVICE WITH ALIGNED STRUCTURES AND METHOD FOR FABRICATING SAME

BACKGROUND OF THE INVENTION

1. Field of Invention

This invention relates to optical micromachined or micro-electromechanical system based devices with aligned structures and methods for fabricating these structures.

2. Description of Related Art

Coupling of light signals between an, optical fiber and an optical system has been a challenging issue in the design of optical systems for optical fiber communication. Strict alignment between optical fibers and optical devices, such as lenses, waveguides, photo-detectors, and the like, is needed to achieve a high coupling efficiency. For example, for single-mode fibers, alignment tolerance is normally less than 1 micron.

In particular in a micro-optoelectromechanical system (MOEMS), accurate alignment between various structures is critical to prevent undesirable optical losses. Micro-electromechanical system (MEMS) structures are normally defined on a subsrate with non-planar topography, that is, with various structures defined in different structural layers. It is difficult to achieve alignment of structures fabricated in different structural layers with an accuracy better than 1 micron. Thus, it is difficult to the alignment accuracy needed for high efficiency coupling with micro-optoelectromechanical system-based devices.

For example, for a micro-optoelectromechanical system having one or more waveguides that is to be in placed communication with an optical fiber may include a V-groove for coupling the optical fiber. The system requires a misalignment between the waveguide(s) and the V-groove of less than 1 micron to achieve high precision coupling of light signals from the optical fiber to the waveguide(s), or vice versa, to reduce optical loss.

Conventionally, alignment of waveguides and optical fibers is achieved by manual adjustment, for example, under a microscope. Such adjustment is labor intensive and costly.

SUMMARY OF THE INVENTION

The devices and methods of this invention provide high efficiency coupling between an optical fiber and an optical device.

The devices and methods of this invention separately provide accurate alignment of an optical fiber and an optical device.

The devices and methods of this invention separately provide automatic alignment of an optical fiber and an optical device.

The devices and methods of this invention separately provide alignment of an optical fiber and an optical device with reduced labor and/or cost.

This invention separately provide a micro-optoelectromechanical system-based device having an optical component accurately aligned with a coupling structure for an optical fiber.

According to various exemplary embodiments of the device of this invention, a micro-optoelectromechanical system based device with aligned structures comprises a waveguide formed in a silicon layer of the device and at least one optical fiber connection structure that is self-aligned with the at least one optical structure. In embodiments, the waveguide is formed in a silicon layer of the device. The silicon layer may be a single-crystal-silicon layer. A nitride layer may be formed on at least a portion of the waveguide.

According to various exemplary embodiments of the methods of this invention, a micro-optoelectromechanical system based device with aligned structures is fabricated by defining at least one optical structure using a masking layer and defining at least one optical fiber connection structure using the same masking layer. In embodiments, the at least one optical fiber connection structure is etched in a substrate of the device. In other embodiments, the at least one optical structure is etched in a silicon layer of the device.

According to various exemplary embodiments of the methods of this invention, a micro-optoelectromechanical system based device with aligned structures is fabricated by: providing a silicon-on-insulator wafer comprising a single-crystal-silicon layer, a substrate and an insulator layer therebetween; selectively removing a first portion of the single-crystal-silicon layer; defining at least one optical structure using a masking layer; defining at least one optical fiber connection structure using the same masking layer; selectively removing a second portion of the single-crystal-silicon layer to obtain the at least one optical structure; and selectively removing a portion of the substrate to obtain the at least one optical fiber connection structure.

In various embodiments, a layer of nitride is formed over the single-crystal-silicon layer and the substrate after selectively removing the first portion of the single-crystal-silicon layer. In various embodiments, an oxide is formed on a least the single-crystal-silicon layer after selectively removing the second portion of the single-crystal-silicon layer. The oxide is subsequently removed from the single-crystal-silicon layer.

In various embodiments, a second masking layer is formed after selectively removing the second portion of the single-crystal-silicon layer and before selectively removing the portion of the substrate. In various embodiments, a sacrificial layer is formed after selectively removing the second portion of the single-crystal-silicon layer and before forming the second masking layer. A portion of the sacrificial layer may be removed after forming the second masking layer. The second masking layer and the sacrificial layer may be removed after selectively removing the portion of the substrate.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention described in detail below, with reference to the attached drawing figures, in which:

FIGS. 2–12 are cross-sectional views illustrating an exemplary method of fabricating, according to the invention, a micro-optoelectromechanical system-based device.

DETAILED DESCRIPTION OF EXEMPLARY EMBODIMENTS

This invention provides micro-optoelectromechanical system based devices with aligned structures. According to the invention, the device comprises at least one optical structure formed in a silicon layer of the device and at least one optical fiber connection structure that is self-aligned with the at least one optical structure. In various exemplary embodiments, the at least one optical fiber connection structure is formed in a substrate of the device. The at least one optical fiber connection structure may comprise a V-groove. In other embodiments, the at least one optical structure may comprise a waveguide. A nitride layer may be formed on at least a portion of the waveguide. In various embodiments, the silicon layer may be a single-crystal-silicon layer of a silicon-on-insulator wafer.

This invention also provides methods for fabricating a micro-optoelectromechanical system based device with aligned structures. According to the invention, at least one optical structure is defined using a masking layer and at least one optical fiber connection structure is defined using the same masking layer. In various exemplary embodiments, the at least one optical fiber connection structure is etched in a substrate of the device. In other embodiments, the at least one optical a structure is etched in a silicon layer of the device.

According to various exemplary embodiments of this invention, micromachining and other microelectromechanical system based manufacturing techniques are used to fabricate an optical system that is to be coupled with an optical fiber. Such manufacturing technologies are relatively advanced compared to other potential technologies, yielding more reliable results and greater flexibility. In various exemplary embodiments, surface micromachining techniques are used to fabricate the optical system from a silicon on insulator (SOI) wafer as a starting substrate.

The methods of this invention automatically align an optical fiber connection structure with and the optical device. In other words, the optical fiber connection structure is self-aligned with the optical device. In this way, the devices and methods of this invention achieve high efficiency coupling between an optical fiber and an optical device. The alignment between the optical fiber and the optical device is highly accurate and may be achieved with reduced labor and/or cost, as compared to known manual methods of alignment.

Figure 1:
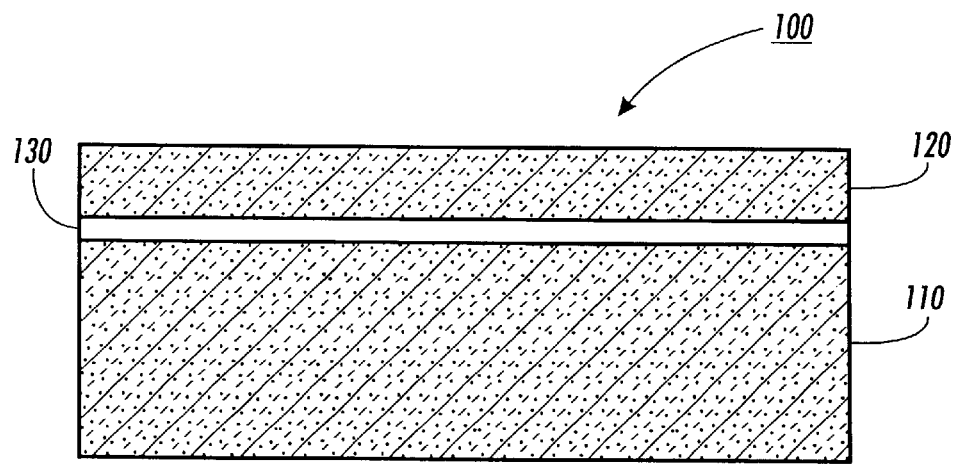
FIG. 1 is a cross-sectional view of a silicon-on-insulator wafer used to fabricate, according to an exemplary embodiment of the invention, a micro-optoelectromechanical system-based device.

FIGS. 1–12 illustrate various steps of an exemplary embodiment of a method according to this invention. As shown in FIG. 1, the process of the exemplary embodiment begins with a silicon-on-insulator (SOI) wafer 100. The silicon-on-insulator wafer 100 comprises a silicon substrate 110, a single-crystal-silicon (SCS) layer 120 and an insulator layer 130 therebetween.

Figure 2:
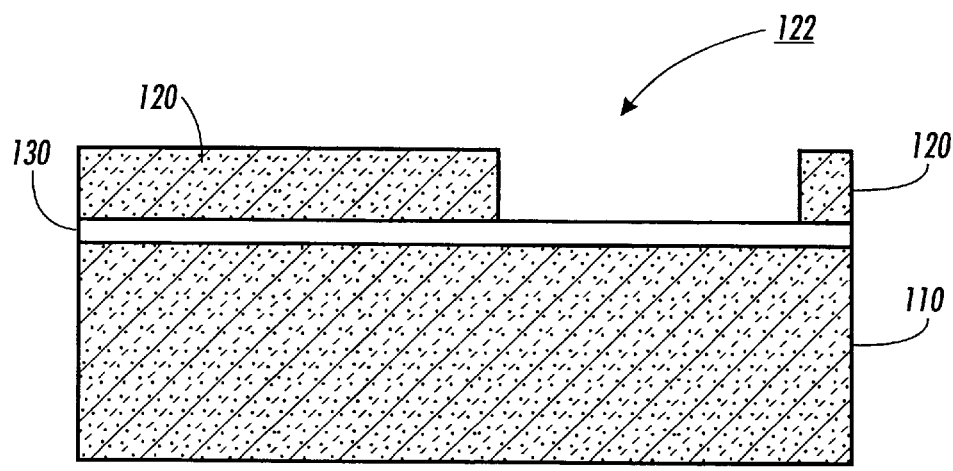

As shown in FIG. 2, a first portion 122 of the single-crystal-silicon layer 120 is selectively removed. Any suitable process, either known or hereafter developed, may be used to remove the portion 122. For example, a photolithographic process such as dry etching with a photoresist may be used. The removal of the portion 122 provides a recess area for a optical fiber connection structure, described below.

Figure 3:
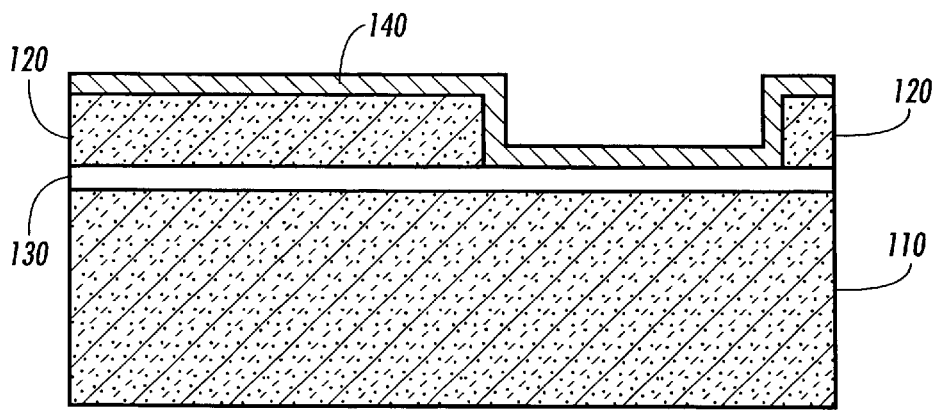

As shown in FIG. 3, a first nitride layer 140 is formed over the single-crystal-silicon layer 120 and the silicon substrate 110. Any suitable process, either known or hereafter developed, may be used to form the first nitride layer 140. For example, the first nitride layer 140 may be deposited using a low pressure chemical vapor deposition (LPCVD) process.

Figure 4:
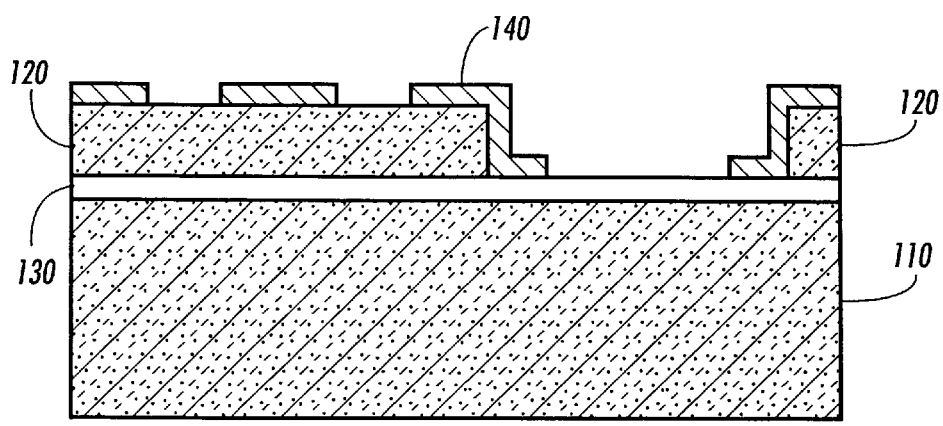

As shown in FIG. 4, the first nitride layer 140 is patterned to form a first masking layer for a subsequent etch. The first nitride layer 140 also serves as an anti-reflection coating for one or more waveguides, described below. Any suitable process, either known or hereafter developed, may be used to pattern the first nitride layer 140. For example, the first nitride layer 140 may be patterned by dry etching with a photoresist.

As described below, the first masking layer formed by the first nitride layer 140 is used to define both the optical structure of the device, for example, the waveguide(s), and the optical fiber connection structure, for example, the V-groove. Because the same masking layer is used, the optical fiber connection structure may be accurately and automatically aligned with the optical structure of the device during fabrication.

Figure 5:
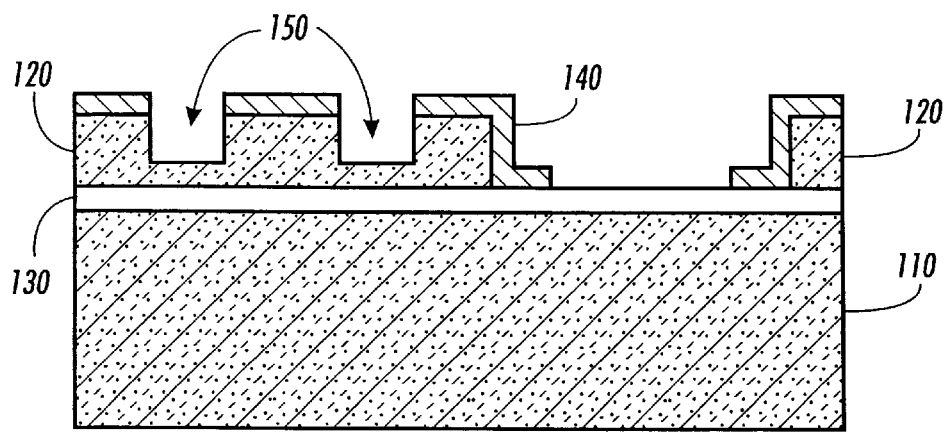

Using the nitride layer 140, waveguides 150, such as ridge-waveguides, are formed in the single-crystal-silicon layer 120, as shown in FIG. 5. Any suitable process, either known or hereafter developed, may be used to form the waveguides 150. For example, the waveguides 150 may be etched using a dry etch, such as reactive ion etching (RIE).

Figure 6:
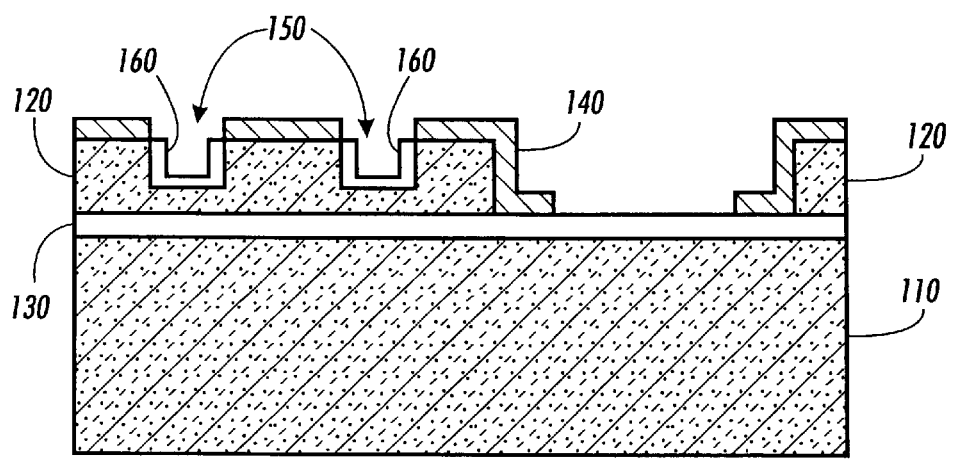

Next, as shown in FIG. 6, an oxide 160 may be formed on sidewalls of the waveguides 150. This may be accomplished, for example, by a short thermal oxidation process. The oxide 160 is subsequently removed, for example, using a wet etch process. Forming and removing the oxide 160 improves the smoothness and regularity of the sidewalls of the waveguides 150.

After the sidewalls of the waveguides 150 are optionally treated as described with respect to FIG. 6, a sacrificial layer 170 is formed over the nitride layer 140, the single-crystal-silicon layer 120 and the insulator layer 130, as shown in FIG. 7. Then, as also shown in FIG. 7, a second nitride layer 180, such as silicon nitride, is formed over the sacrificial layer 170. Any suitable process, either known or hereafter developed, may be used to form the sacrificial layer 170 and the second nitride layer 180. For example, a low pressure chemical vapor deposition (LPCVD) process may be used.

As shown in FIG. 8, the second nitride layer 180 is patterned to form a second masking layer for a subsequent etch. Any suitable process, either known or hereafter developed, may be used to pattern the second nitride layer 180. For example, the second nitride layer 180 may be patterned by dry etching with a photoresist.

Accurate patterning of the second nitride layer 180 to form the second mask layer is difficult because the second nitride layer 180 has a nonplanar topography. However, the second mask layer does not have to be completely accurate. For example, three or four microns of misalignment may not result in any alignment problem in the final device. This is because the critical lateral dimensions of the optical fiber connection structure and the position of the optical fiber connection structure relative to the optical structure (waveguides) are already determined by the first masking layer formed by the first nitride layer 140.

Figure 9:
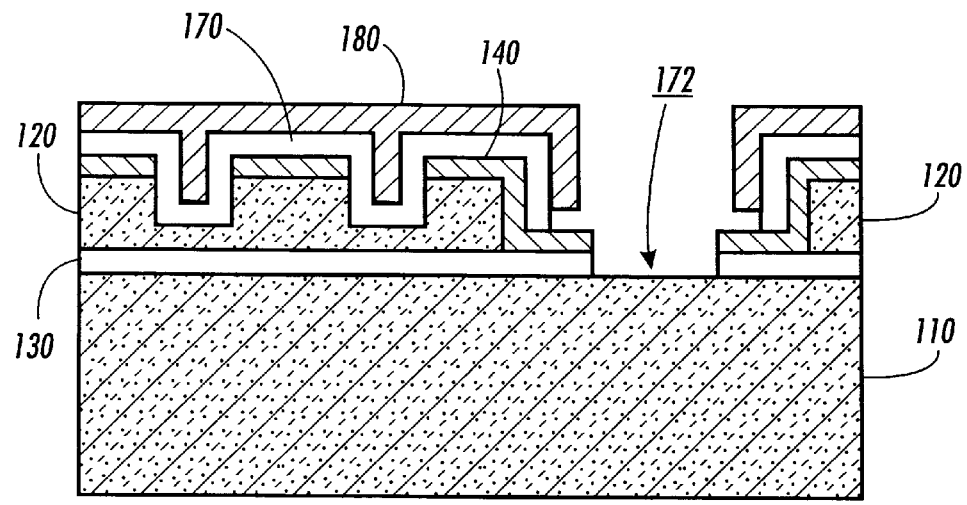

As shown in FIG. 9, a portion 172 of the sacrificial layer 170 is removed to expose an opening for the optical fiber connection structure, described below. Any suitable process, either known or hereafter developed, may be used to remove the portion 172. For example, the portion 172 may be etched using a wet etch process with a photoresist.

Figure 10:
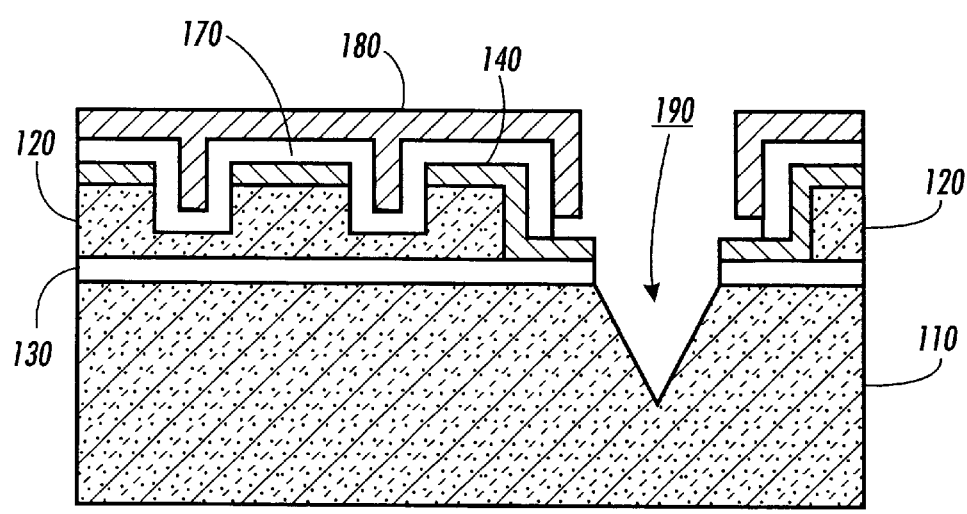

As shown in FIG. 10, after removal of the photoresist, a portion of the silicon substrate 110 is removed to form a V-groove 190 as the optical fiber connection structure of the device. Any suitable process, either known or hereafter developed, may be used to from the V-groove 190. For example, a KOH etch may be used. Controlling the temperature of the etching solution and the etching time will determine a desired depth of the V-groove 190.

Figure 11:
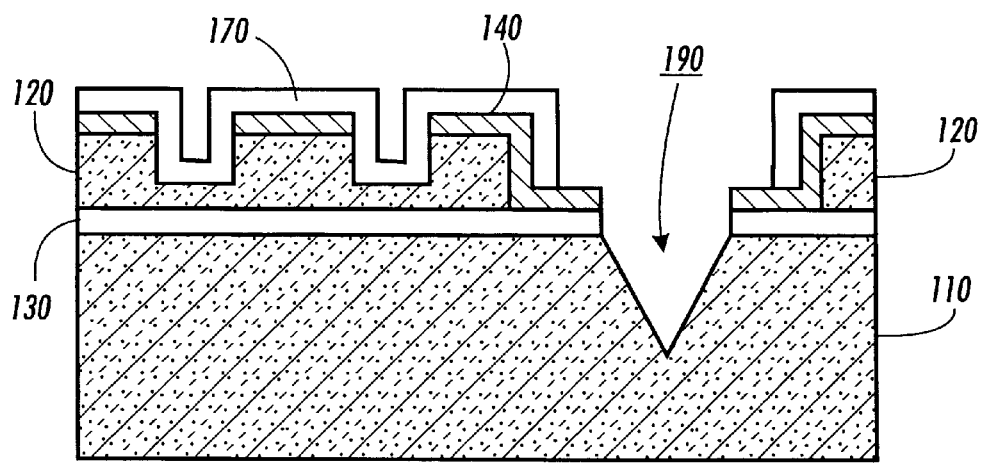
Figure 12:
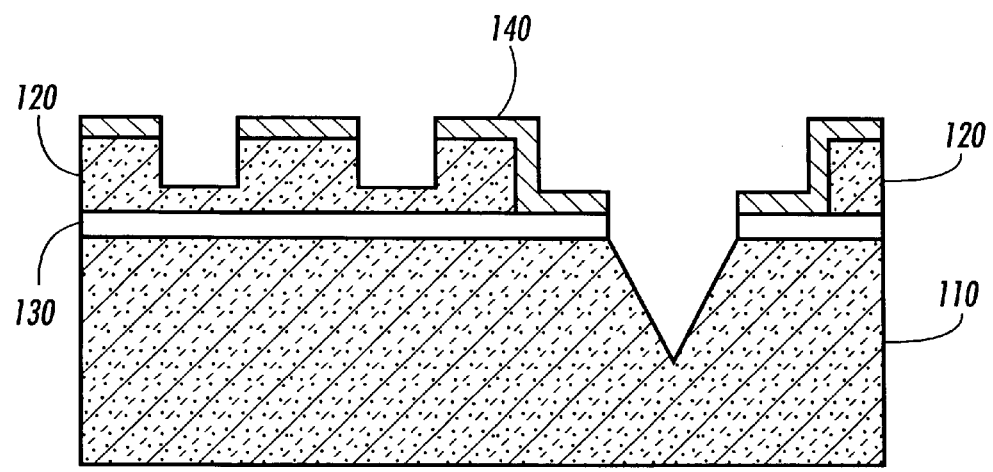

Then, as shown in FIG. 11, the second nitride layer 180 is removed, for example, using an unmasked dry etch or a wet etch in phosphoric acid. As shown in FIG. 12, the remaining sacrificial layer 170 is removed, for example, using a wet etch. According to the exemplary method, the V-groove 190 and the waveguides 150 are accurately aligned. Thus, a micro-optoelectromechanical system based device with aligned structures is obtained.

While this invention has been described in conjunction with various exemplary embodiments, it is to be understood that many alternatives, modifications and variations would be apparent to those skilled in the art. Accordingly, Aplicants intend to embrace all such alternatives, modifications and variations that follow in the spirit and scope of this invention.

For example, it should be understood that the design and configuration of the micro-optoelectromechanical system based device are illustrative and not limiting. The methods of this invention may be used to fabricate various devices in which alignment between an optical structure and optical fiber connection structure is required. For example, the methods of this invention may be used in the fabrication of a monolithic add/drop multiplexer, as described in copending U.S. Application No. (Attorney Docket No. 108757), filed herewith and incorporated by reference in its entirety.

What is claimed is:

1. A method for fabricating a micro-optoelectromechanical system based device with aligned structures, comprising:

defining at least one optical structure using a masking layer; and defining at least one optical fiber connection structure using the same masking layer.

2. The method of claim 1, wherein defining the at least one optical fiber connection structure comprises defining a V-groove.

3. The method of claim 1, further comprising etching the at least one optical fiber connection structure in a substrate of the device.

4. The method of claim 1, wherein defining the at least one optical structure comprises defining a waveguide.

5. The method of claim 1, further comprising etching the at least one optical structure in a silicon layer of the device.

6. The method of claim 5, wherein etching the at least one optical structure in the silicon layer comprises etching the at least one optical structure in a single-crystal-silicon layer of the device.

7. A method for fabricating a micro-optoelectromechanical system based device with aligned structures, comprising:

providing a silicon-on-insulator wafer comprising a single-crystal-silicon layer, a substrate and an insulator layer therebetween;

selectively removing a first portion of the single-crystal-silicon layer;

defining at least one optical structure using a masking layer;

defining at least one optical fiber connection structure using the same masking layer;

selectively removing a second portion of the single-crystal-silicon layer to obtain the at least one optical structure; and selectively removing a portion of the substrate to obtain the at least one optical fiber connection structure.

8. The method of claim 7, further comprising forming a layer of nitride over the single-crystal-silicon layer and the substrate after selectively removing the first portion of the single-crystal-silicon layer.

9. The method of claim 7, further comprising:

forming an oxide on a least the single-crystal-silicon layer after selectively removing the second portion of the single-crystal-silicon layer; and removing the oxide from the single-crystal-silicon layer.

10. The method of claim 7, further comprising forming a second masking layer after selectively removing the second portion of the single-crystal-silicon layer and before selectively removing the portion of the substrate.

11. The method of claim 10, further comprising forming a sacrificial layer after selectively removing the second portion of the single-crystal-silicon layer and before forming the second masking layer.

12. The method of claim 11, further comprising removing a portion of the sacrificial layer after forming the second masking layer.

13. The method of claim 11, further comprising removing the second masking layer and the sacrificial layer after selectively removing the portion of the substrate.

14. A micro-optoelectromechanical system based device with aligned structures, comprising:

at least one optical structure formed in a silicon layer of the device; and at least one optical fiber connection structure that is self-aligned with the at least one optical structure.

15. The device of claim 14, wherein the at least one optical fiber connection structure is formed in a substrate of the device.

16. The device of claim 14, wherein the at least one optical fiber connection structure comprises a V-groove.

17. The device of claim 14, wherein the at least one optical structure comprises a waveguide.

18. The device of claim 17, further comprising a nitride layer formed on at least a portion of the waveguide.

19. The device of claim 14, wherein the silicon layer is a single-crystal-silicon layer.

20. The device of claim 19, further comprising:

a substrate; and an insulator layer disposed between the substrate and the single-crystal-silicon layer.

* * * * *